(12) United States Patent
Zhang et al.

(10) Patent No.: US 11,654,627 B2
(45) Date of Patent: May 23, 2023

(54) SYSTEM AND METHOD FOR THREE-DIMENSIONAL PRINTING

(71) Applicant: SPRINTRAY INC., Los Angeles, CA (US)

(72) Inventors: Jing Zhang, Redondo Beach, CA (US); Amirhossein Mansourighasri, Redondo Beach, CA (US); Abdol Hossein Bassir, Redondo Beach, CA (US)

(73) Assignee: SprintRay, Inc., Los Angeles, CA (US)

( * ) Notice: Subject to any disclaimer, the term of this patent is extended or adjusted under 35 U.S.C. 154(b) by 666 days.

(21) Appl. No.: 16/088,028

(22) PCT Filed: Mar. 24, 2017

(86) PCT No.: PCT/US2017/024118
§ 371 (c)(1),
(2) Date: Sep. 24, 2018

(87) PCT Pub. No.: WO2017/165832
PCT Pub. Date: Sep. 28, 2017

(65) Prior Publication Data
US 2020/0282646 A1  Sep. 10, 2020

Related U.S. Application Data

(60) Provisional application No. 62/313,575, filed on Mar. 25, 2016.

(51) Int. Cl.
*B29C 64/00* (2017.01)
*B29C 64/255* (2017.01)
(Continued)

(52) U.S. Cl.
CPC ........... *B29C 64/255* (2017.08); *B22F 10/85* (2021.01); *B22F 12/00* (2021.01); *B22F 12/82* (2021.01);
(Continued)

(58) Field of Classification Search
CPC .................... B29C 64/255; B29C 64/232
See application file for complete search history.

(56) References Cited

U.S. PATENT DOCUMENTS 5,122,441 A * 6/1992 Lawton ................ B29C 64/129
430/394
7,731,887 B2 6/2010 Hull et al.
(Continued)

FOREIGN PATENT DOCUMENTS

| WO | 2012/006531 A2 | 1/2012 |
| WO | 2013/030064 A1 | 3/2013 |
| WO | 2016/025579 A1 | 2/2016 |

OTHER PUBLICATIONS

International Search Report, dated May 31, 2017, for PCT/US2017/024118, 5 pages.
(Continued)

*Primary Examiner* — Nicholas R Krasnow
(74) *Attorney, Agent, or Firm* — Jafari Law Group, Inc.

(57) ABSTRACT

A system and method for providing three-dimensional printing is disclosed. The three-dimensional printing technology includes enhanced functionality to provide better resolution printing, filtration of forming materials stored within a reservoir tank, and a simple and efficient cleaning process to remove debris from the reservoir subsequent to a printing cycle.

11 Claims, 11 Drawing Sheets

(51) Int. Cl.

| | |
|---|---|
| *B29C 64/232* | (2017.01) |
| *B29C 64/245* | (2017.01) |
| *B29C 64/386* | (2017.01) |
| *B29C 64/277* | (2017.01) |
| *B29C 64/35* | (2017.01) |
| *B29C 64/30* | (2017.01) |
| *B29C 64/176* | (2017.01) |
| *B22F 10/85* | (2021.01) |
| *B29C 64/40* | (2017.01) |
| *B29C 64/10* | (2017.01) |
| *B33Y 40/20* | (2020.01) |
| *B22F 12/00* | (2021.01) |
| *B29C 64/205* | (2017.01) |
| *B33Y 80/00* | (2015.01) |
| *B33Y 40/00* | (2020.01) |
| *B29C 64/20* | (2017.01) |
| *B29C 64/307* | (2017.01) |
| *B33Y 40/10* | (2020.01) |
| *B29C 64/227* | (2017.01) |
| *B33Y 70/00* | (2020.01) |
| *B33Y 50/00* | (2015.01) |
| *B33Y 99/00* | (2015.01) |
| *B22F 12/82* | (2021.01) |
| *B29C 64/393* | (2017.01) |
| *B33Y 50/02* | (2015.01) |
| *B29C 64/182* | (2017.01) |
| *B33Y 10/00* | (2015.01) |
| *B33Y 30/00* | (2015.01) |
| *B29C 64/25* | (2017.01) |

(52) U.S. Cl.
CPC ............. *B29C 64/00* (2017.08); *B29C 64/10* (2017.08); *B29C 64/176* (2017.08); *B29C 64/182* (2017.08); *B29C 64/20* (2017.08); *B29C 64/205* (2017.08); *B29C 64/227* (2017.08); *B29C 64/232* (2017.08); *B29C 64/245* (2017.08); *B29C 64/277* (2017.08); *B29C 64/30* (2017.08); *B29C 64/307* (2017.08); *B29C 64/35* (2017.08); *B29C 64/386* (2017.08); *B29C 64/393* (2017.08); *B29C 64/40* (2017.08); *B33Y 40/00* (2014.12); *B33Y 40/10* (2020.01); *B33Y 40/20* (2020.01); *B33Y 50/00* (2014.12); *B33Y 50/02* (2014.12); *B33Y 70/00* (2014.12); *B33Y 80/00* (2014.12); *B33Y 99/00* (2014.12); *B29C 64/25* (2017.08); *B33Y 10/00* (2014.12); *B33Y 30/00* (2014.12)

(56) References Cited

U.S. PATENT DOCUMENTS

| | | | | |
|---|---|---|---|---|
| 9,033,513 | B2 | 5/2015 | Lin | |
| 10,717,233 | B1* | 7/2020 | Bulard | B33Y 10/00 |
| 2008/0174050 | A1* | 7/2008 | Kikuchi | B29C 64/106 |
| | | | | 264/401 |
| 2013/0337100 | A1* | 12/2013 | Costabeber | B29C 64/264 |
| | | | | 425/174 |
| 2015/0064298 | A1* | 3/2015 | Syao | B29C 64/124 |
| | | | | 425/169 |
| 2015/0183168 | A1* | 7/2015 | Liverman | B29C 64/135 |
| | | | | 425/166 |
| 2015/0360477 | A1 | 12/2015 | Khe et al. | |
| 2016/0279869 | A1* | 9/2016 | Gruber | B29C 64/135 |
| 2016/0303795 | A1* | 10/2016 | Liu | B29C 64/364 |
| 2017/0246797 | A1* | 8/2017 | Lambrecht | B33Y 30/00 |
| 2018/0200948 | A1* | 7/2018 | Kuijpers | B29C 64/364 |
| 2018/0370136 | A1* | 12/2018 | Stadlmann | B33Y 30/00 |

OTHER PUBLICATIONS

Written Opinion, dated May 31, 2017, for PCT/US2017/024118, 11 pages.

* cited by examiner

SYSTEM AND METHOD FOR THREE-DIMENSIONAL PRINTING

BACKGROUND

Technical Field

The disclosed technology generally relates to systems and methods for three-dimensional (3D) printing and, more particularly to 3D printing with enhanced resolutions, cleaning capabilities and operational efficiencies.

Description of the Related Art

Three-dimensional printing has existed for many years. However, many existing systems suffer from low resolution printing of desired printed objects. Furthermore, many 3D printers suffer from material (e.g., resin) building up within the material tank reservoir creating interference with subsequent printing cycles. To clean the built up material within the tank, a difficult and time consuming process is required to adequately and completely remove all the debris and buildup from the material tank. Finally, many 3D printing systems in use today are very expensive.

Accordingly, there has been a long felt need for a more cost effective, high resolution 3D printing system that is both flexible in printing functionality as well as easy to maintain and to clean.

BRIEF SUMMARY

Briefly, and in general terms, various embodiments are directed to systems and methods for 3D printing. More particularly, various embodiments relate to a 3D printing system and method having an enhanced resolution printer to produce objects with greater detail. Still further, some embodiments include an easy to clean functionality to quickly and effectively clean the material tank. And still further, the 3D systems and methods generally are cost effective to use and operate.

In one embodiment, a projector is used to project a blue or ultraviolet light or any other appropriate wavelength based on the forming material properties onto a forming material to cause activation of the forming material to form a solid object.

In one embodiment, the energy source that may be used with the disclosed technology is an LED Projector. The energy source is not limited to a UV LED projector, and it can be thermal, laser beam, electron beam, spark or any other acceptable energy source. The disclosed projector is equipped with an LED instead of metal halide bulb to enhance the power efficiency and the uniformity of the output while significantly minimizing the distortion of the projected images.

In one embodiment, the blue or ultraviolet light or any other appropriate wavelength based on the forming material properties produced by the projector and projected onto the forming material is generated by a driver circuit that controls a plurality of Light Emitting Diodes (LED), each diode being either red, green or blue in color. In operation, the driver circuit is modified by software and/or hardware to deactivate all the LEDs except for the blue light emitting LED. In this way, the projector only activates the blue LED thus causing only blue or ultraviolet light or any other appropriate wavelength based on the forming material properties to be emitted and projected onto the forming material. In one embodiment, a micromirror device chip is used herein to project the blue or ultraviolet light, or any other appropriate wavelength based on the forming material properties, and the micromirror has a resolution of 1200×800 pixels. Other resolutions are also applicable.

In another embodiment, the projector is fabricated to generate and emit any specific form of energy required by a forming agent to activate the forming agent to turn into a solid object. For example, when a forming material or agent is used that requires other forms of energy, e.g., infrared light, laser light, X-rays, gamma radiation and the like, the projector may be fabricated to generate and output such required energy. Therefore, for example, when infrared is projected onto the forming agent, the appropriate hardware and software must be employed so that the projector can generate and project such infrared light. Likewise, if X-rays or gamma radiation is used, the projector may be replaced entirely by an energy emitter that can produce and emit the appropriate energy format onto the forming agent.

In one embodiment, a plurality of projectors having the same or different energy outputs may be used with any given printing system and printing cycle.

In one embodiment, the disclosed 3D printing technology includes a forming material reservoir used to store the forming material before, during and after a printing cycle. The forming materials can be any appropriate substance, including, but not limited to resins, ceramics, metals, biologics, organic compounds and/or any combinations thereof. In addition, more than one forming agent or material may be stored in the forming material reservoir and used during a printing cycle.

In another embodiment, the material reservoir is formed of a top drum assembly, a base assembly and a middle layer interposed between the top assembly and the base assembly. The middle layer is typically composed of a self-lubricating material. By being interposed between the top assembly and the base assembly, the middle layer prevents bubbles from forming within the forming material stored within the reservoir. The drum assembly has a stretched hydrophobic surface that sits on a flat transparent surface.

In another embodiment, the printing system includes a mechanism for cleaning debris that can result from a printing cycle. In one embodiment, the reservoir can include sensors that detect whether there is debris or contaminants in the forming material or on the surface of the reservoir. The cleaning system and method uses the projector to project an appropriate energy for the material in use, e.g., ultraviolet light, onto the base of the forming material reservoir. Using the energy from the projector, the debris coagulates into a single, easily removable layer. Once coagulated, either a user can manually remove the debris layer or a wiper mechanism 96 (FIG. 15) may be used to remove the coagulated debris layer. The result in either event is that only unspoiled and uncontaminated forming material remains within the reservoir.

In another embodiment, a single-use top drum assembly can be provided that contains the forming material for a single printing session for a single solid object creation. Once the process is complete, the single use drum can be discarded. In this configuration, there is no need for the cleaning functionality as the drum is replaced after its initial use.

Similarly, a filtration system may be deployed in the reservoir. The filtration system continuously filters the forming material stored in the reservoir to remove any impurities that may be found within the forming material or agent.

A three-dimensional printing system may be summarized as including: a reservoir tank, the tank storing one or more forming materials that interact with an electromagnetic radiation to form a solid object; a projector for projecting high resolution electromagnetic radiation onto the forming materials to form the solid object; and a lifting mechanism that rises from the reservoir tank as the solid object is formed, whereby additional layers of the object can be formed as the object is raised from the reservoir.

The projector may project a blue light, ultraviolet light or any other appropriate wavelength based on the properties of the forming material onto the forming material to form the solid object.

The three-dimensional printing system may further include a micromirror device chip having a resolution of 1200×800 pixels.

The reservoir tank may further include a stretched hydrophobic material in the shape of a drum. The reservoir tank may further include a top drum assembly, a base assembly, and a middle layer interposed between the drum assembly and the base assembly. The middle layer may be comprised of a self-lubricating material. The self-lubricating material may be selected from the group consisting of PDMS, self-lubricating gels, oil, and an air gap. The middle layer may prohibit the formation of bubbles in the forming material stored within the reservoir tank. The top drum assembly may be a single use assembly containing forming materials for a single printing session and may be thereafter discarded. The reservoir tank may further include one or more sensors for detecting when contaminants or debris is found within the forming material or on a surface of the reservoir tank. The reservoir tank may further include a filtration system to remove impurities from the forming materials.

A projector used in three-dimensional printing may be summarized as including: a plurality of Light Emitting Diodes, (LED), each LED being either red, green or blue in color; and a driver circuit used to activate the multiple LEDs, wherein the driver circuit is modified to only activate the blue LED.

A method for cleaning a reservoir tank may be summarized as including: removing any remaining forming material from the reservoir that was not converted into a solid object during a 3D printing cycle; projecting electromagnetic radiation onto a reservoir surface to cause any remaining solid debris residing thereon to coagulate together; and removing the coagulated debris from the reservoir tank surface.

The removing of the coagulated debris may be performed using a wiper mechanism.

A method of preventing bubble formation in a forming material stored in a reservoir tank may be summarized as including: in a forming material reservoir having a top drum assembly and a base assembly, affixing a thin middle member between the drum assembly and the base assembly.

A method of using a projector in a three-dimensional printing system may be summarized as including: installing in the projector a driver circuit used to activate three Light Emitting Diodes, (LED), each LED being red, green or blue in color; using software to program the driver circuit so that all the LEDs, except the blue LED, are deactivated; and using the software to activate the blue LED driver circuit causing the blue LED to emit a blue light; whereby the projector projects the blue light therefrom.

A three-dimensional printing system may be summarized as including: a reservoir tank, the tank storing one or more forming agents that interact with an electromagnetic energy to form a solid object; a projector for generating and projecting the electromagnetic energy onto the forming agent to form the solid object; and a lifting mechanism that rises from the reservoir tank as the solid object is formed, whereby additional layers of the object can be formed as the object is raised from the reservoir.

The projector may generate and project ultraviolet light in the range of 365 to 410 nanometers onto the forming agent to form the solid object. The projector may emit blue light having a wavelength range between 405 and 410 nanometers.

A three-dimensional printing system may be summarized as including: a reservoir tank, the tank storing one or more forming agents that interact with an electromagnetic energy to form a solid object; a plurality of projectors for generating and projecting the electromagnetic energy onto the forming agent to form the solid object; and a lifting mechanism that rises from the reservoir tank as the solid object is formed, whereby additional layers of the object can be formed as the object is raised from the reservoir.

The projectors may each generate and project blue light onto the forming agent to form the solid object. Each of the projectors may generate and emit a different form of electromagnetic energy for projection onto the forming agent to form a solid object.

A light engine for use in three-dimensional printing may be summarized as including: a light source for generating light; a light box; a first, second, third and fourth converging lens; a collimating lens; a fly's eye lens; a collecting lens; a digital micromirror device chip; and a prism, wherein light is passed from the light source towards the light box so that the light passes through the first converging lens towards the collimating lens and thereafter on to the fly's eye lens resulting in two stages of convergence that are then passed through the second and third converging lenses and the collecting lens that then passes the light onto the digital micromirror device chip with the light then being reflected off the prism and through the fourth converging lens and out of the light engine.

Other features will become apparent from the following detailed description, taken in conjunction with the accompanying drawings, which illustrate by way of example, the features of the various embodiments.

DETAILED DESCRIPTION

Figure 1:
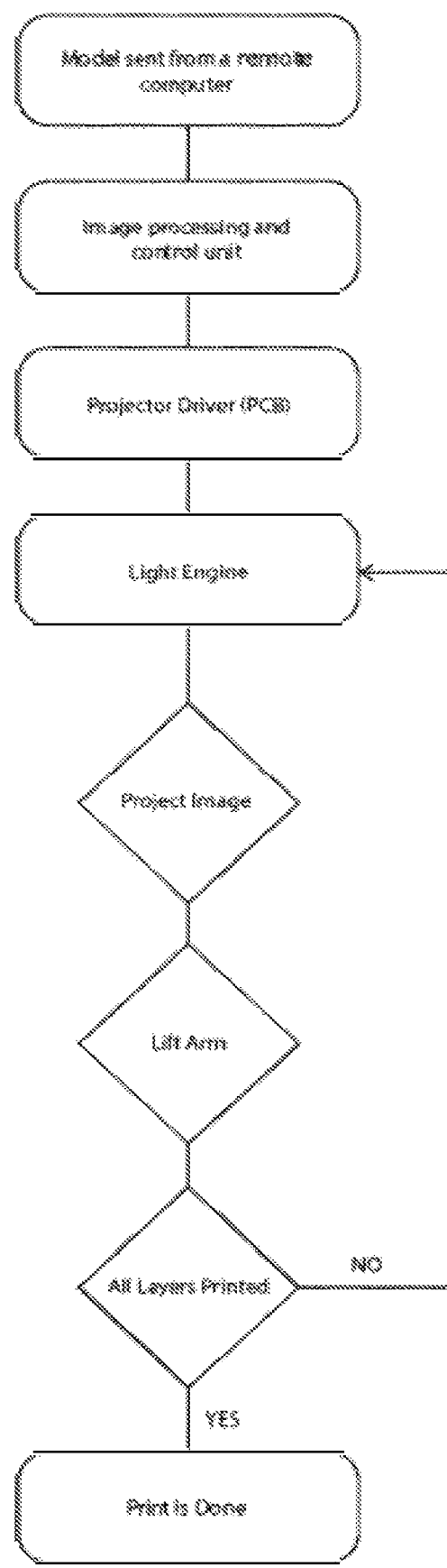
FIG. 1 is a general flow-chart of a system configured for use in performing the disclosed 3D printing.

Each of the features and teachings disclosed herein can be utilized separately or in conjunction with other features and teachings to provide the disclosed 3D printing systems and methods.

The presently disclosed 3D printing technology provides a cost effective, high resolution printing solution. In addition, there is disclosed an improved forming material reservoir tank that is easy to clean, thus improving the use of the printing technology in subsequent printing cycles.

Briefly, the disclosed printing system uses forming materials or agents to create solid objects. The forming materials can be any of resins, ceramics, metals, biologics, organic compounds and/or any combination thereof. Each component is activated and made solid based upon a different energy signature. In some embodiments, to produce a solid object from a selected material, the projector generates/produces and projects/emits energy, for example, electromagnetic energy, corresponding to the specific material in use. For example, certain resins may be used that react to ultra-violet light, while other resins react to infrared light or other forms of energy emissions. Similarly, any appropriate material may be used to create a solid form, as desired. For example, ceramic materials, metal materials, biologics, organic compounds, e.g., proteins, or any other appropriate material and combinations thereof may be used to print the desired solid object. The projector merely needs to be designed and implemented to emit the proper electromagnetic energy that causes the reaction in the material in use. By way of example, such electromagnetic energy can include, but is not limited to laser light, ultraviolet light, infrared light, x-rays, gamma radiation, and proton emissions. Other forms of energy may also be used to react with the materials including, but not limited, heat, compression, and sound using an appropriate transmission device to transfer the energy to the material in use.

At the outset, it should be understood that one of ordinary skill in the art will appreciate that not all systems have all these components and that such systems may have other components in addition to, or in lieu of, those components mentioned here. Furthermore, while these components are viewed and described separately, various components may be integrated into a single unit in some embodiments.

Further, representative examples utilizing many of these features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm as used herein is generally conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms presented herein are not inherently related to any particular computer or other apparatus. Various general-purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

In the following description, certain specific details are set forth in order to provide a thorough understanding of various disclosed embodiments. However, one skilled in the relevant art will recognize that embodiments may be practiced without one or more of these specific details, or with other methods, components, materials, and the like. In other instances, well-known structures associated with servers, networks, displays, media handling, computers and/or processor/control systems have not been shown or described in detail to avoid unnecessarily obscuring descriptions of the embodiments.

Unless otherwise indicated, the functions described herein may be performed by executable code and instructions stored in a computer readable medium and running on one or more processor-based systems. However, state machines and/or hardwired electronic circuits may also be utilized. Further, with respect to the example processes described herein, not all of the process states need to be reached, nor do the states have to be performed in the illustrated order. Further, certain process states that are illustrated as being serially performed may be performed in parallel.

Similarly, unless expressly stated to be otherwise, while certain embodiments may refer to a Personal Computer ("PC") system or data device, other computer or electronic systems may be used as well, such as, without limitation, an interactive television, a network-enabled personal digital assistant ("PDA"), a network game console, a networked entertainment device, a smart phone (e.g., with an operating system and on which a user may install applications) and the like.

In addition, while certain user inputs are described as being provided via phone key-presses, data entry via a keyboard, or by clicking a computer mouse or button, touchscreen optionally, user inputs may be provided using other techniques, such as by voice or otherwise. The example screen layouts, appearance, and terminology as depicted and described herein, are intended to be illustrative and exemplary, and in no way limit the scope of the invention as claimed.

The terms, "for example," "e.g.," "in one/another aspect," "in one/another scenario," "in one/another version," "in some configurations" "in some implementations," "preferably," "usually," "typically," "may," and "optionally," as used herein, are intended to be used to introduce non-limiting embodiments. Unless expressly stated otherwise, while certain references are made to certain example system components or services, other components and services may be used as well and/or the example components may be combined into fewer components and/or divided into further components. The terms, "member" and "user," are used interchangeably. Members and users are subscribed to or enrolled in a network service or network of users.

Figure 2:
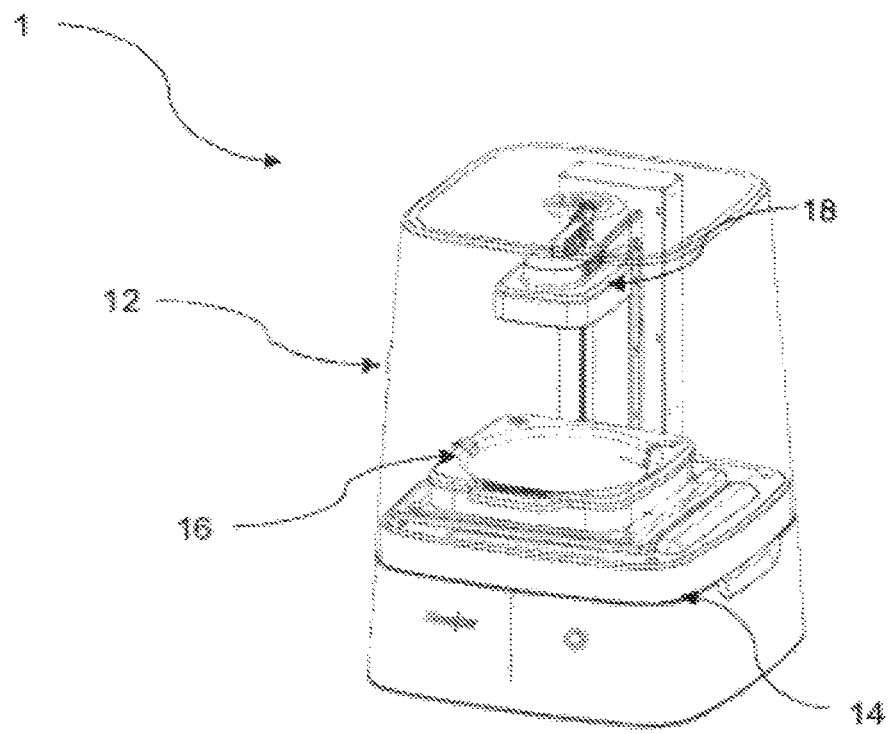
FIG. 2 is an isometric view of the 3D printing system.
Figure 3:
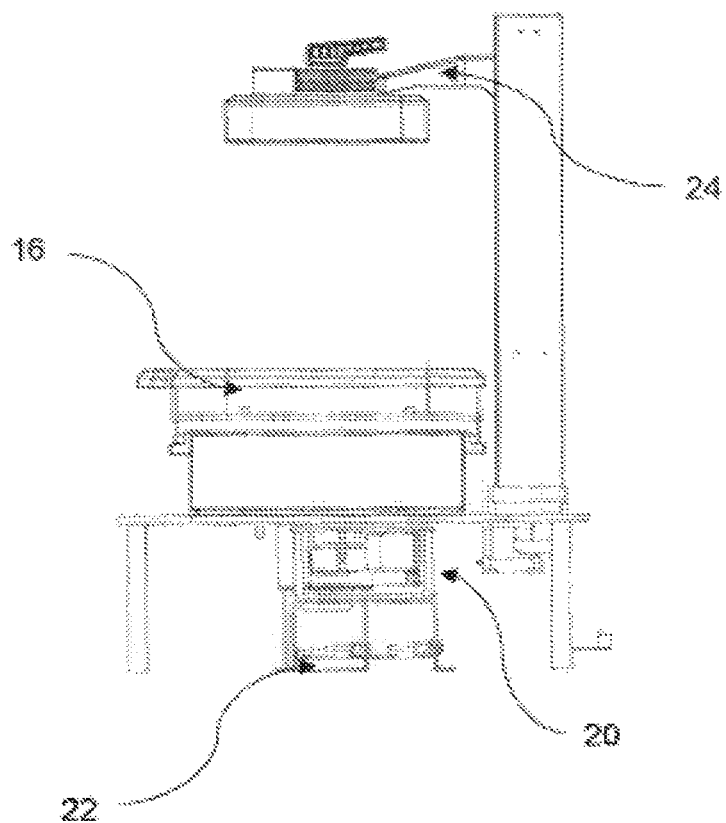
FIG. 3 is the side view of the 3D printing system without top and bottom cover.

Referring now to the drawings, wherein like reference numerals denote like or corresponding parts throughout the drawings and, more particularly to FIG. 2, there is shown a general system configured for use as a 3-D printing system 10. The printing system 10 includes an outer housing 12, bottom housing 14, a forming material reservoir tank 16, a build platform module 18, a projection system 20, a controller 22 and a lifting arm 24. It will be appreciated that the printing system 10 can be made to any size so as to produce printed products of any size.

It will be appreciated that the image capture and processing module 20 may be resident within the printing system 10 itself, or such functionality can reside external to the printing system. When the module 20 is resident within the printing system 10, the module includes all necessary processors, memories and components to enable communication with a user and/or an external computing system. No specific hardware or software requirements are necessary other than the processor must be sufficiently fast to timely process the data and the memory sufficiently large enough to store any required data and the printing model information. When in use, information such as diagnostics, printing instructions and any other information can be activated and used by the printing system 10 and/or relayed to a user.

Alternatively, in some embodiments, the image capturing and processing module 20 (or any other computing power) can reside external to the printing system 20. In this case, the printing system 10 can include a data port for communicating with the external computing system. The data port can use any communication protocol that enables proper communication between the printing system 10 and the external computing system. Similarly, in some embodiments, a wireless interface (not shown) can be incorporated into the printing system 10 to enable wireless communication between the printing system and an external computing system. Information such as diagnostics, printing instructions and any other information can be communicated wirelessly.

Figure 4:
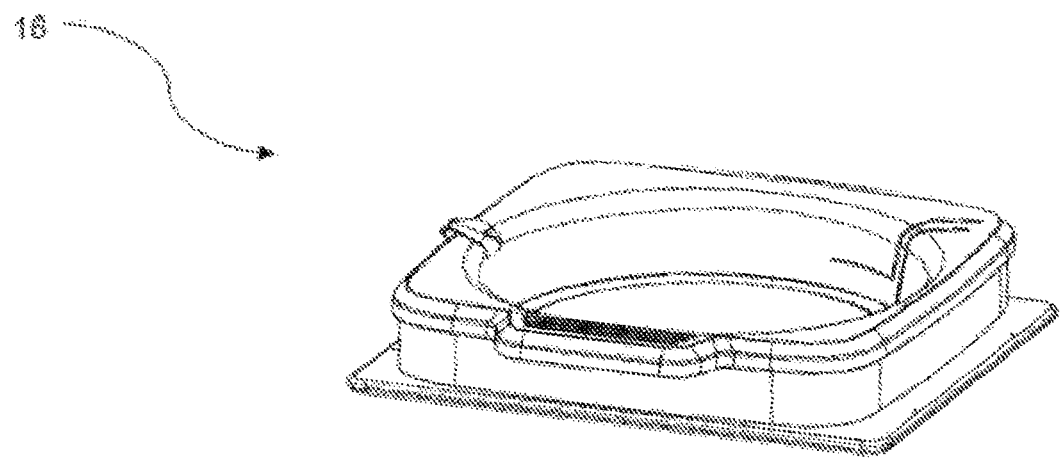
FIG. 4 is the isometric view of the reservoir tank assembly.

Reservoir Tank:

Referring to FIG. 4, there is shown a 3D printing material forming reservoir tank 16, which has top drum assembly 26, a base assembly 28 and a middle member 30.

Figure 6:
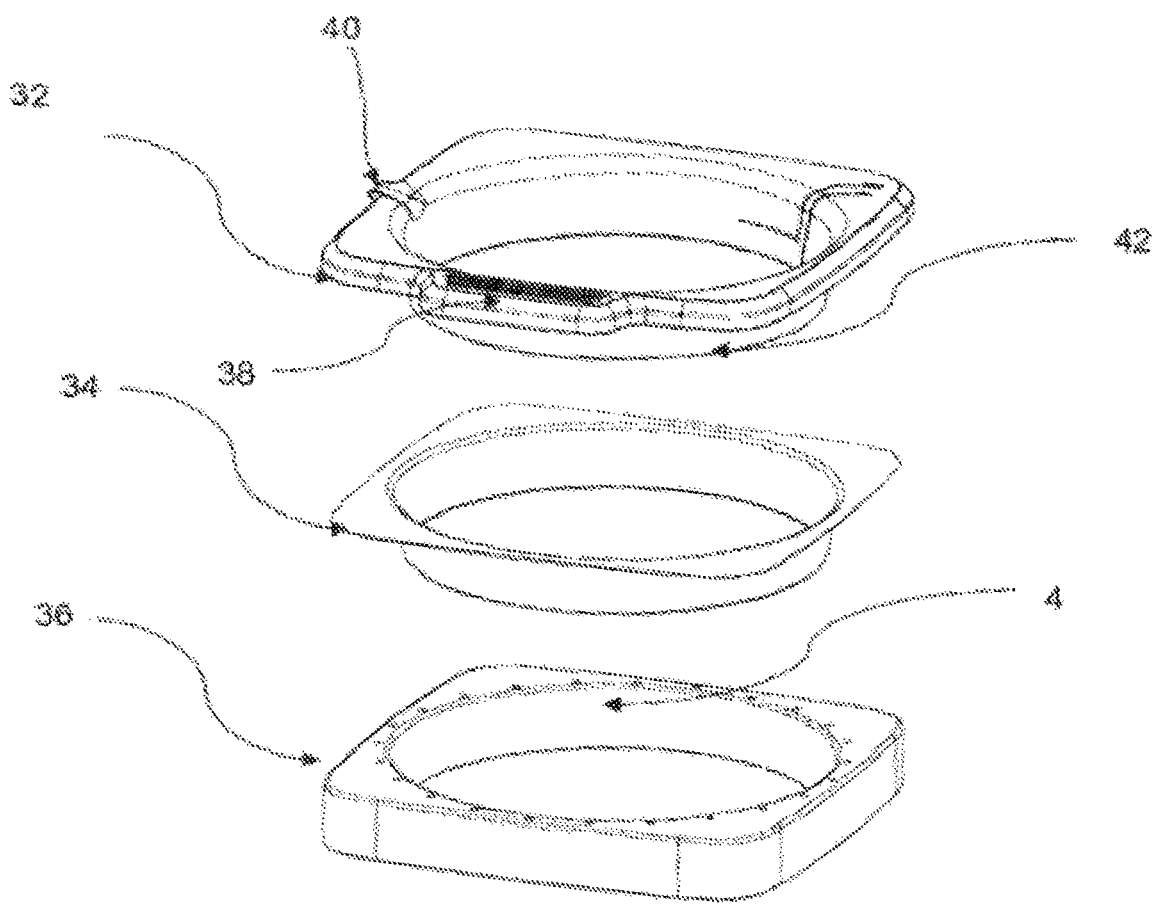
FIG. 6 is the exploded view of the drum assembly.

In one or more embodiments, the drum assembly 26 is where the forming material is stored. The drum assembly 26 includes a top stretcher 32, a thin hydrophobic membrane 34 and a bottom portion 36. The methodology of stretching the film uses the edges of the top stretchers 42 to push the hydrophobic membrane 34 into the inner wall of the bottom portion 46 to create a tension on the hydrophobic membrane 34. The hydrophobic membrane 34 is flat before forming. It turns into a shape of a bowl, as shown in FIG. 6, after it is stretched.

The drum assembly 26 has a handle 38 to pull the material forming tank 16 out of the 3D printer. Then the drum stretcher 32 is secured to the bottom portion 28 using screws, a snap fit, key ins, or any other acceptable attaching mechanism. The hydrophobic membrane 34 might be stretched using other approaches such as, by way of example and not by way of limitation, creating a vacuum, strings on the corners, change of temperature or change of physical state. The shape of the top stretcher 32 might be round, rectangular, hexagonal or any other acceptable shape.

The drum assembly 12 includes a drain system 34 to remove the material from the tank with minimal waste. The draining process may be performed manually by the user or it may be performed automatically using a suction system. The drum assembly 12 sits upon and is secured to the base assembly 14 using screws, snap fit, keying in, or any other appropriate attachment mechanism.

Figure 7:
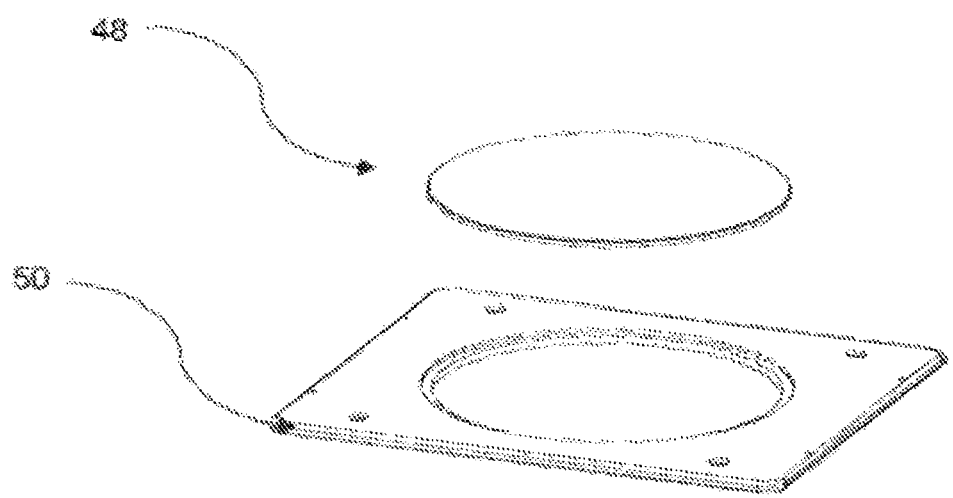
FIG. 7 is exploded view of the base assembly.
Figure 8:
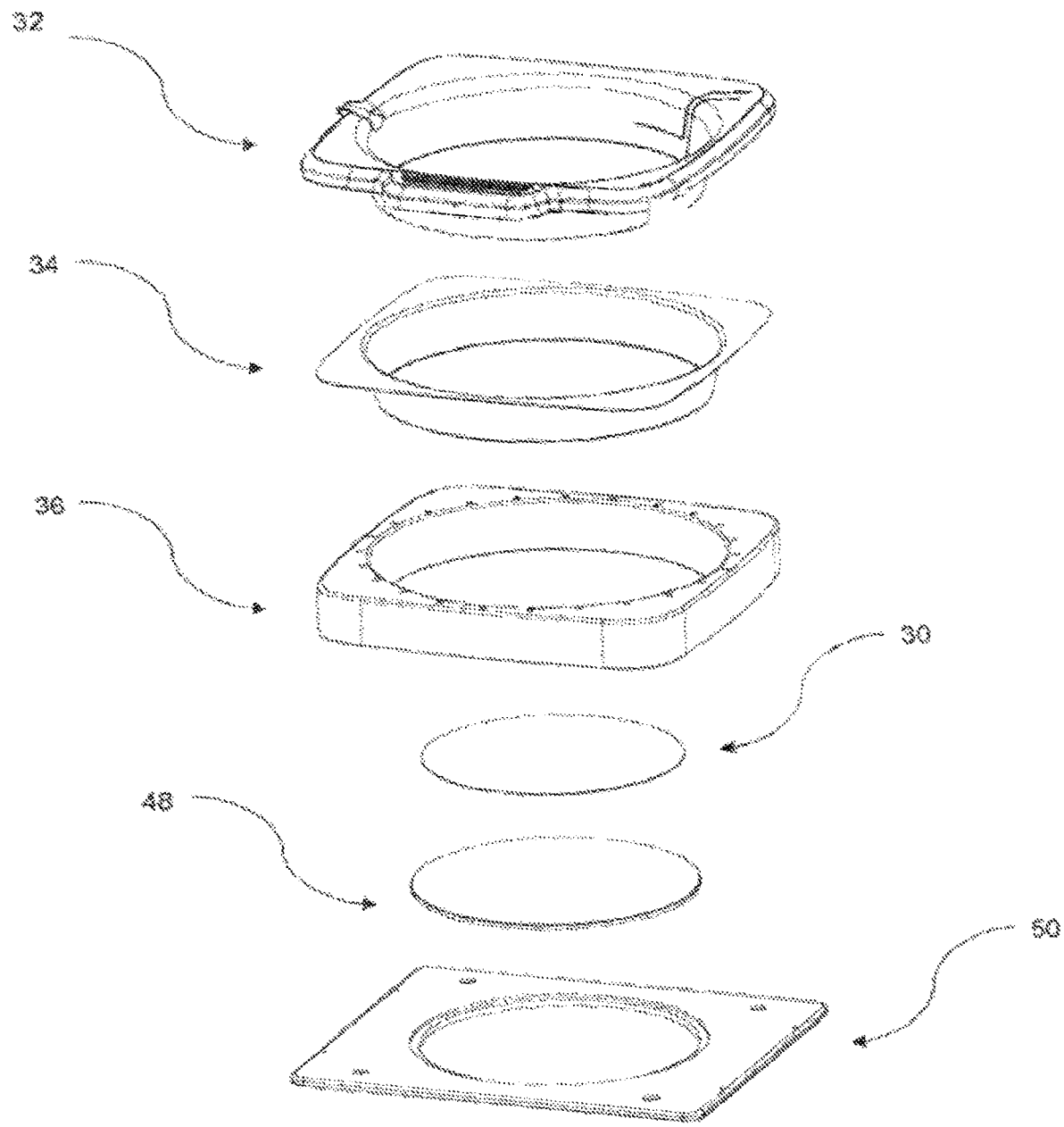
FIG. 8 is the exploded view of the tank assembly with parts of the sub-assemblies.

Referring to FIG. 7, the base assembly 28 includes a flat transparent surface 48 such as glass or other appropriate material and a holder 50 that is of an appropriate material, including metal, plastics, or other sufficiently rigid and strong material. The base 50 is used to place the tank assembly inside the 3D printer. The flat transparent surface 48 is attached by appropriate mechanisms, e.g., glue or snap fit, to the base 50. The shape of the transparent surface 48 may be round, rectangular or any other acceptable shape.

Figure 5:
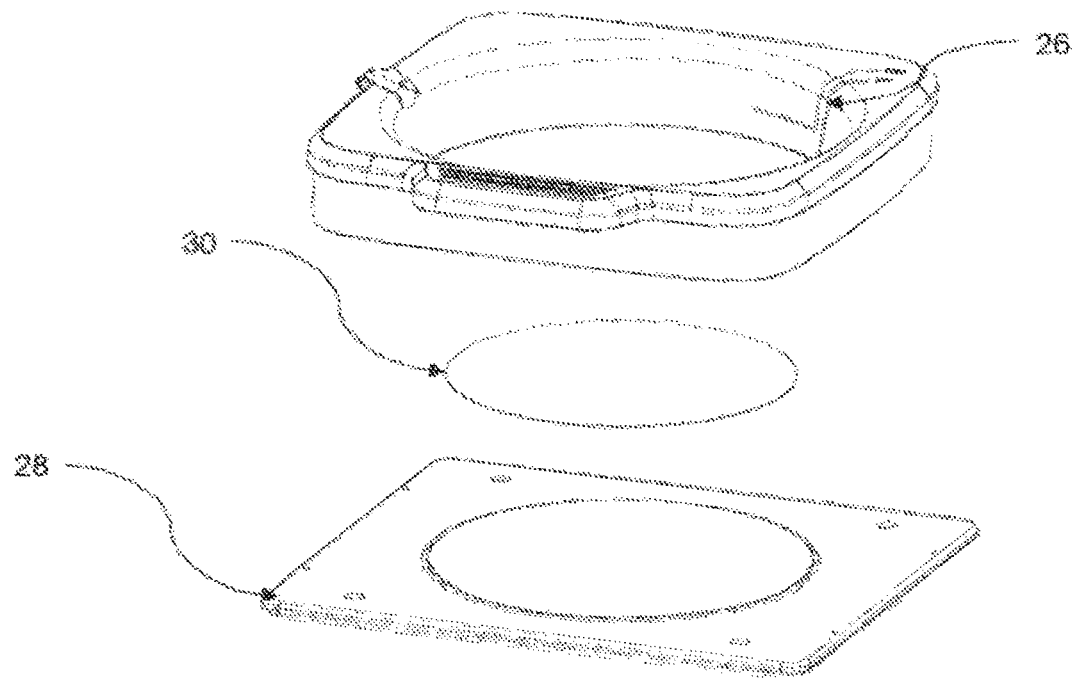
FIG. 5 shows the three subassemblies of reservoir tank assembly.

Anti-Bubble Membrane:

Referring to FIG. 5, in one or more embodiments, the middle member 30 is placed between the drum assembly 26 and the base assembly 28 and has two important roles. The self-lubricating surface of the middle member 30 prevents bubbles from forming between the transparent flat surface 38 and the hydrophobic membrane 34. The second role of the middle member 30 is that it has a self-lubricating surface that is used to prevent the hydrophobic membrane 34 and the flat surface 48 from sticking to the middle member 30. It is noted that the middle member 30 material and the method of preventing the bubble formation is not restricted to a self-lubricating thin film. Rather, it might be done by using any other appropriate materials such as using Polydimethylsiloxane (PDMS), other silicon based gels, oil or an air gap.

Cleaning and Material Filtration:

In one embodiment, the drum assembly 26 may be equipped with optical, capacitive, magnetic or resistive sensors to detect if there is any contamination or cured residue remaining in or on the reservoir after a print cycle is completed. The cleaning process is performed in conjunction with the 3D printing software that is installed on the computer that controls the 3D printer remotely, and/or in the processor that is placed inside the 3D printer itself. A wireless interface may also be used such that instructions can be transmitted to the printer from external sources.

In one or more embodiments, the cleaning method includes forming a geometry that covers the entire build space when the build platform is removed. Typically, a thin layer of cured forming material is formed on the bottom surface of the tank to coagulate all the debris and cured residue together. This is accomplished by using the projector to emit energy onto the debris and cured residue. Once the debris and cured material is coagulated, it is easy to remove as a single layer, either manually by the user or automatically, e.g., using a wiper or scraper. Any geometry can be used so long as the entire area of debris or cured contamination is exposed.

In one or more embodiments, the tank assembly 16 may be equipped with a filtration system 16a that continuously passes the forming material through a filter 16b that separates the floating particles and debris from the remaining, unspoiled forming material. The tank assembly 16 may have an automatic forming material refilling system 16c that can maintain a specified amount of forming material in the tank. This may be accomplished by using a reservoir 16d and a pumping system 16e. There may also be sensors 16f to detect when the tank is running low of the forming material (see FIG. 1B).

In an alternative embodiment, the drum assembly 26 is replaceable by the user to reduce the cost of maintenance. The replaceable drum assembly 26 can be used to deliver single-use forming materials to the user. In such an application, the forming material drum assembly 26 is already filled and sealed with a specific forming material and the user merely needs to install the drum on the base 28, break the protective seal and start printing. The user can dispose of the drum 26 or send it for recycling when the printing cycle is completed. In this case, the need to clean the existing reservoir of contaminants and debris is eliminated.

Figure 9:
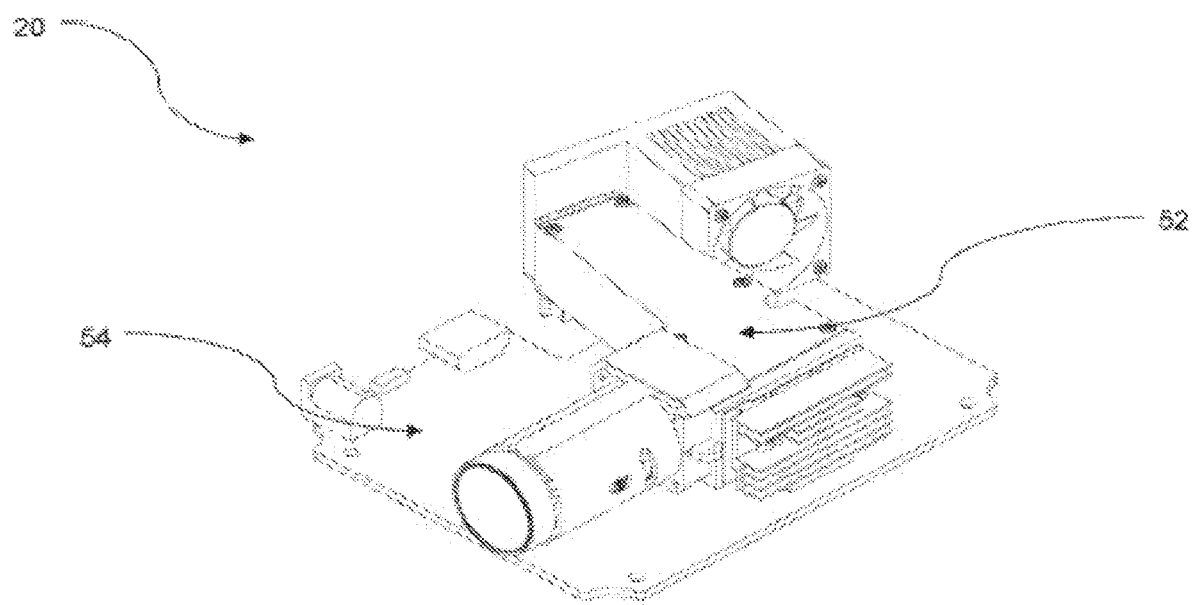
FIG. 9 is the projector module.

Projector:

Referring to FIG. 9, there is shown a 3D printing image projection module 20, which has a light engine assembly 52 and a circuit board assembly 54.

Figure 10:
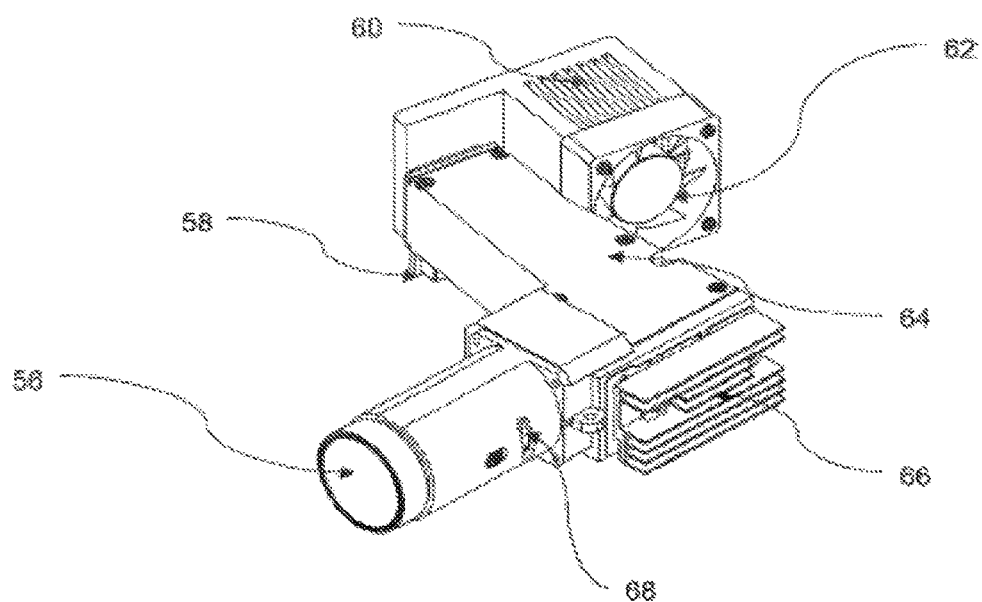
FIG. 10 is the light engine assembly.

Referring to FIG. 10, in one embodiment, the light engine assembly has multiple parts that are each described herein. The LED Light source 58 emits the proper wavelength to cure the forming material being used. In one embodiment, the wavelength that is used in the projector module 20 is 400-410 nanometers. Of course, other wavelength light sources ranging, by way of example, from 365-700 nanometers may be used for curing different forming materials. The LED light source replaces the typical metal halide bulbs in regular 3D printing system. The advantages of using the LED light source is power efficiency, uniform output, and minimal distortion of the image compared to regular projector modules used in 3D printing systems. The internal optical components are placed inside a housing 64 and are discussed in greater detail with reference to FIG. 11. The proper lens 56 ensures a focused and sharpened image is projected onto the forming material reservoir 16. To determine the proper lens' specifications, the focal point for the image is required. In the disclosed technology, the distance is calculated based on the desired size of the projection.

Thereafter, fundamental optics rules are utilized to calculate the proper lens requirements. The focus adjustor 68 is used to fine tune the lens focus.

In one embodiment, the components of the light engine should be cooled during a printing cycle to ensure a stable performance. In some embodiments, a light source heat sink 60 and a fan 62 are attached to the light source to keep the temperature of the LED light source stable. In another embodiment, there is another heat sink installed on the back of a Texas Instruments Digital Micromirror Device chip that is used as a driver circuit for the LED (as explained in greater detail in FIG. 11). The heat sink 66 is used to keep the temperature of the DMD at a nominal level.

As previously discussed, different forming materials are activated by different types of energy. While the projector has been described above with regard to using blue or ultraviolet light or any other appropriate wavelength based on the properties of forming material to activate the forming agent, it will be appreciated by one of ordinary skill in the art that when a forming material or agent is used that requires other forms of energy, e.g., infrared light, laser light, X-rays, gamma radiation and the like, the projector must be modified to generate and output such required energy. Therefore, for example, when infrared is projected onto the forming agent, the appropriate hardware and software must be employed so that the projector can generate and project such infrared light. Likewise, if X-rays or gamma radiation is used, the projector may be replaced entirely by an energy emitter that can produce and emit the appropriate energy format onto the forming agent.

Figure 11:
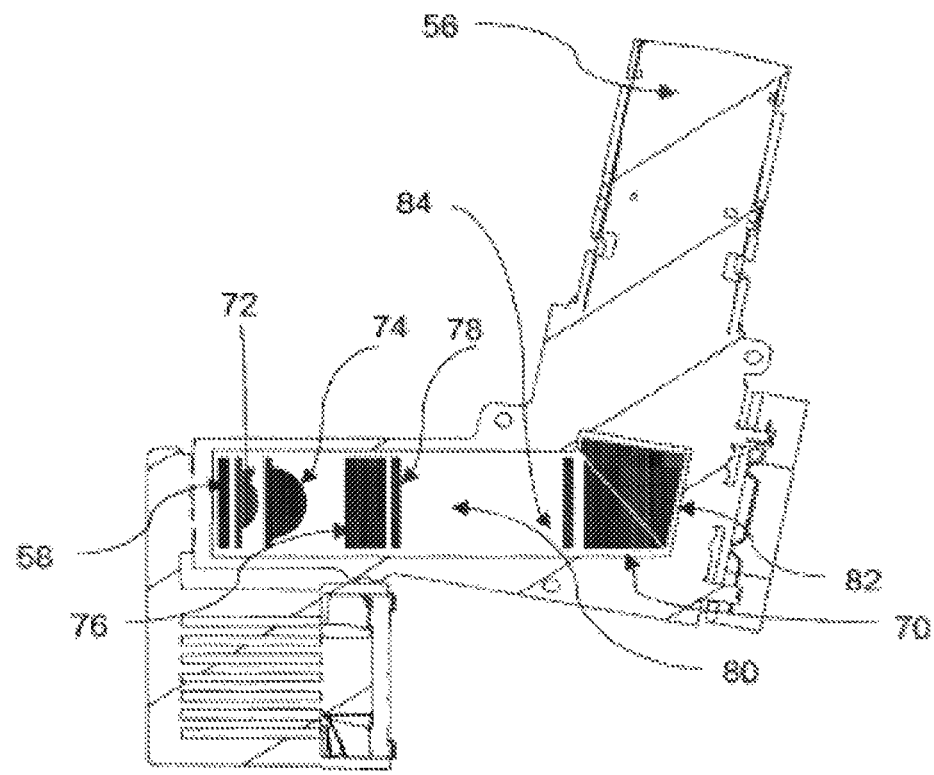
FIG. 11 is the cross section of the light engine.

Referring to FIG. 11, in one embodiment, the LED light source 58 emits the light towards a light box 80. There are several stages of light/image processing, ending with the light striking upon a Texas Instruments Digital Micromirror Device (DMD) chip 82. That is, the configuration of a collimating lens, a fly's eye lens, several converging lenses, a collecting lens, and a prism are used herein to ensure a uniform output with minimal distortion. First, the light emitted from the light source 58 strikes the initial converging lens 72. Then, the light passes through the collimating lens 74. Thereafter, the light strikes the fly's eye lens 76 resulting in two stages of convergence using two more converging lenses 78 and the collecting lens 84. Once the light strikes the DMD, the light is reflected by a prism 70 to a final converging lens 56. The disclosed orientation of the elements located inside the light box, together with the properties of each element, are calculated based on fundamental optical rules.

In one embodiment, the resolution of the DMD for the disclosed technology is 1200×800 pixels. It will be appreciated that other resolutions may also be used. The image projection module 20 is placed at a distance from the forming material reservoir so that each pixel corresponds to 100 microns of real world dimension. For example, if the 1200 pixels in the lengths of the platform is multiplied by 100 microns (the dimension of each pixel), the length of build size will be 1200 millimeters. Similarly, if the 800 pixels width is multiplied by the 100 microns (the dimension of each pixel), the width of the build size will be 800 millimeters. This means that the available build space is 1200 mm×800 mm. Various embodiments may be used with different pixel sizes. By reducing the distance of the image projection module 20 to the forming material reservoir 16, a smaller pixel size can be achieved. This will potentially increase the resolution of the minimum feature size that the 3D printer system is able to fabricate while decreasing the maximum build space. For example, if one embodiment is set so that each pixel of the projector corresponds to 50 microns of real world dimension, then the minimum feature that the 3D printer can fabricate is halved so that the resolution is increased by a factor of two. However, the resulting build size shrinks to 600 mm×400 mm.

In one embodiment, the minimum preferred feature sizes that the current image projector module 20 is capable of achieving in different embodiments ranges from 30 microns to 150 microns. However, one of ordinary skill in the art will appreciate that ranges below 30 microns and above 150 microns can also be used without departing from the scope of the disclosed technology.

In one embodiment, the blue or ultraviolet light or any other appropriate wavelength based on the forming material properties produced by the projector and projected onto the forming material is generated by a driver circuit that controls a plurality of Light Emitting Diodes (LED), each diode being either red, green or blue in color. In operation, the driver circuit is modified by software and/or hardware to deactivate all the LEDs except for the blue light emitting LED. In this way, the projector only activates the blue LED thus causing only blue or ultraviolet light or any other appropriate wavelength based on the forming material properties to be emitted and projected onto the forming material. In one embodiment, a micromirror device chip is used to project the blue, ultraviolet light, or any other appropriate wavelength based on the forming material properties, and has a resolution of 1200×800 pixels.

Figure 14:
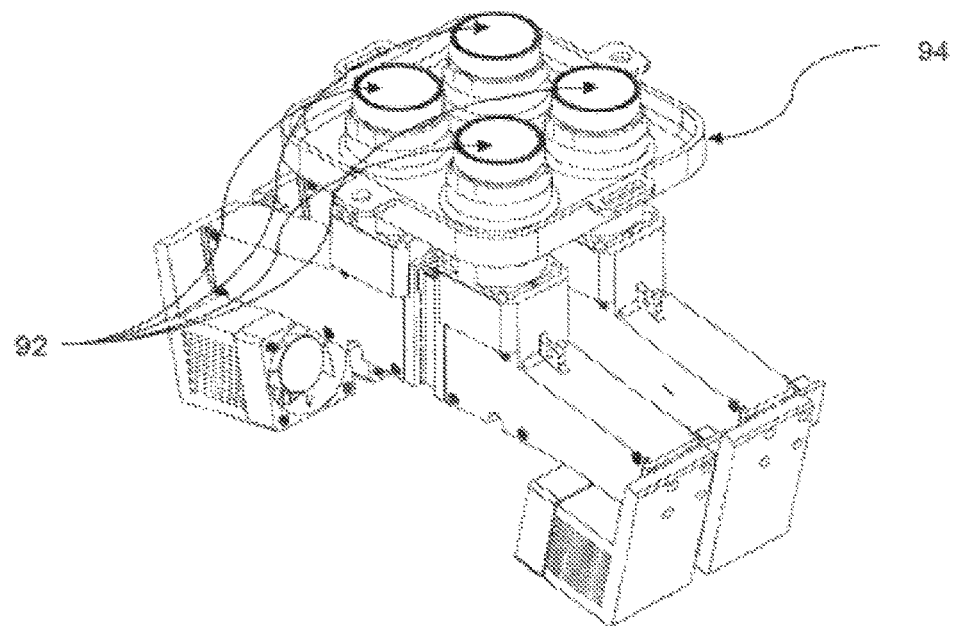
FIG. 14 is the multi projector fixture system.
Figure 15:
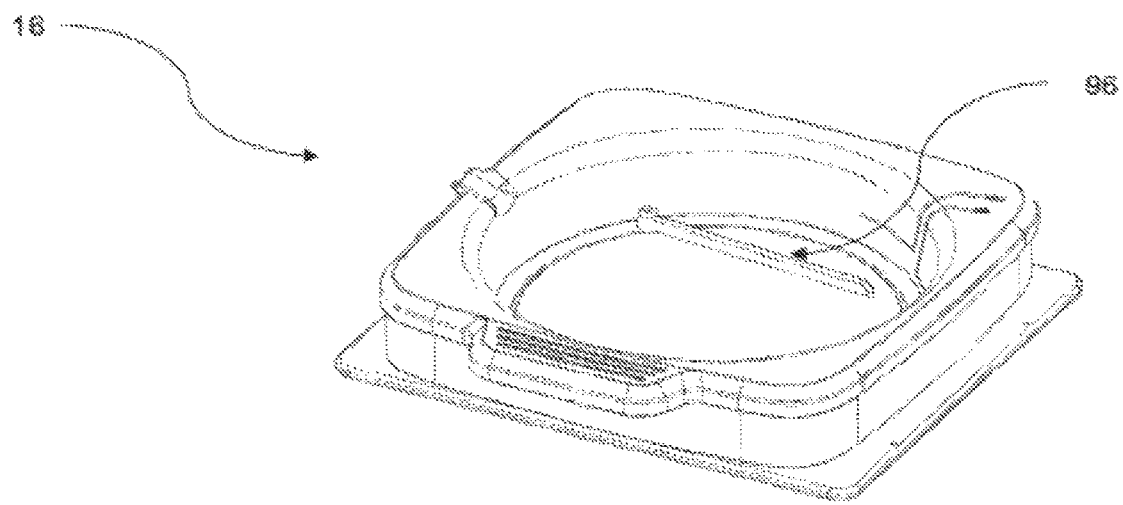
FIG. 15 is the automatic reservoir cleaning system.

Referring to FIG. 14, in another embodiment, multiple light engines 92 may be used to increase the maximum build space while maintaining the resolution. The light engines are placed inside a pre-designed fixture 94 to maintain them in place. In some other embodiments one or multiple light engines are used and translated at the same time over the build space to maintain the resolution while having the maximum build space.

Communication and Control

Figure 16:
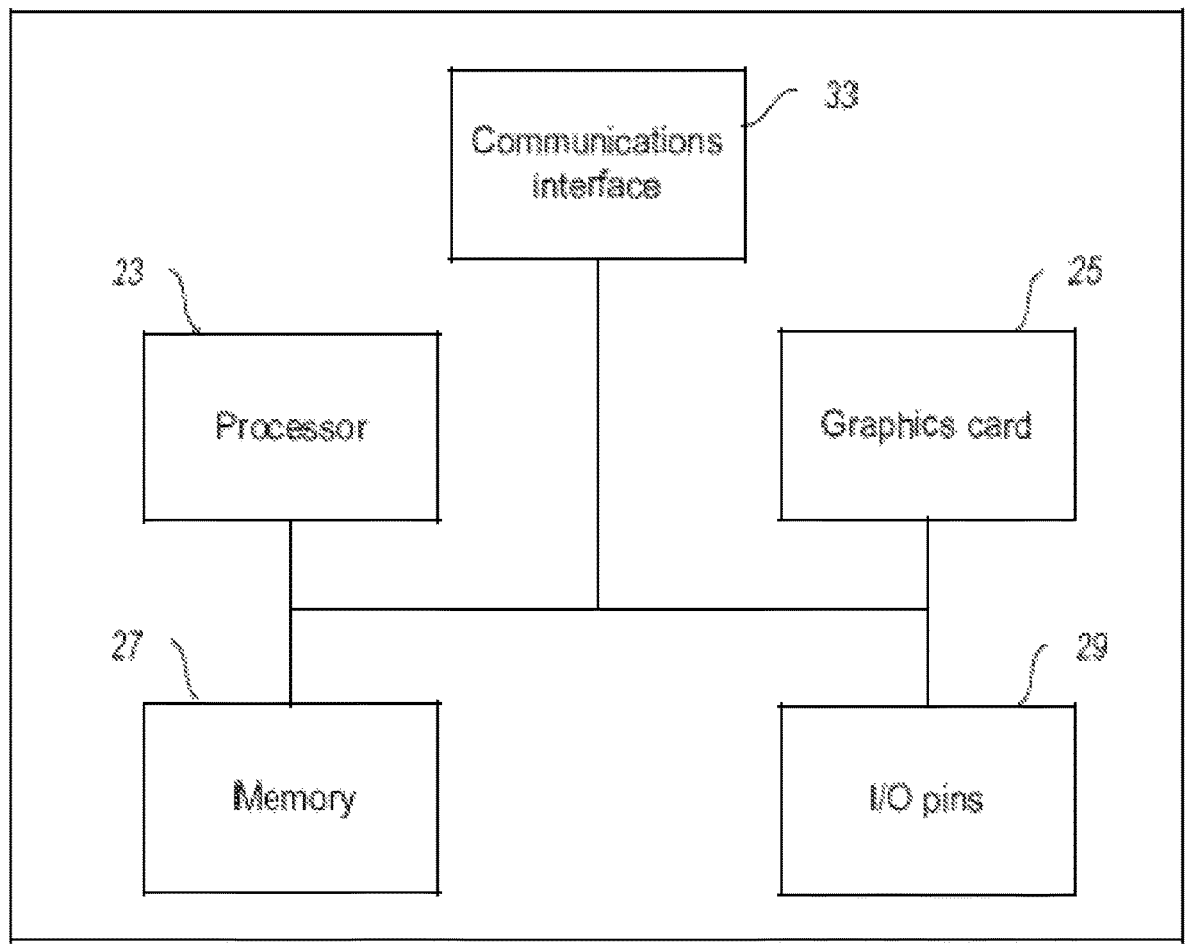
FIG. 16 is a block diagram of a controller.

FIG. 16 is a block diagram of the controller 22. The controller 22 is in charge of receiving the model data from a remote computer, to process the images and to drive the motors. In one embodiment, the image processing computer can be placed inside the 3D printing system itself. In this case, the controller 22 may have one or more processors 23, a graphics card 25, memory 27, input/output pins 29 to drive the motors and to receive data from the sensors, and a communications interface 33. Each of the components may be communicatively coupled via one or more bus(es) 31. It will be appreciated that processors 23 with sufficient processing capabilities and sufficient memory 27 should be used with the disclosed technology. So long as the processor 23 can process the data efficiently and there is sufficient memory 27 to store the captured model or image, no other hardware requirements are necessary. The memory 27 may include one or more nontransitory processor-readable mediums that store processor-executable instructions and data. This controller 22 is directly in contact with the projector module circuit board 54.

In another embodiment, a remote computer drives both the microprocessor (that controls the motors) and the projector module circuit board (i.e., processing the images). The processor 23 used in the controller 22 may be an ARM 3 or any other applicable microcontroller. The communication of the remote computer with the controller 22 via communications interface 33 may be USB Serial, Wireless over the Wi-Fi network, Ethernet, Bluetooth, ZigBee or any other acceptable communication protocol as used in the various embodiments. If a wired connection is used between the controller 22 and remote computer, the connection with the remote computer may be disconnected after the model data is sent to the controller 22. It is understood that the on-board computer processor 23, as well as, any external processing system and/or the wireless interface can be used to capture and to relay data to and from the printing system to a user or to another computing resource. This data can include diagnostic information, printing instructions; re-order requests and any other information or data.

Iteration of Using the System

Figure 1B:
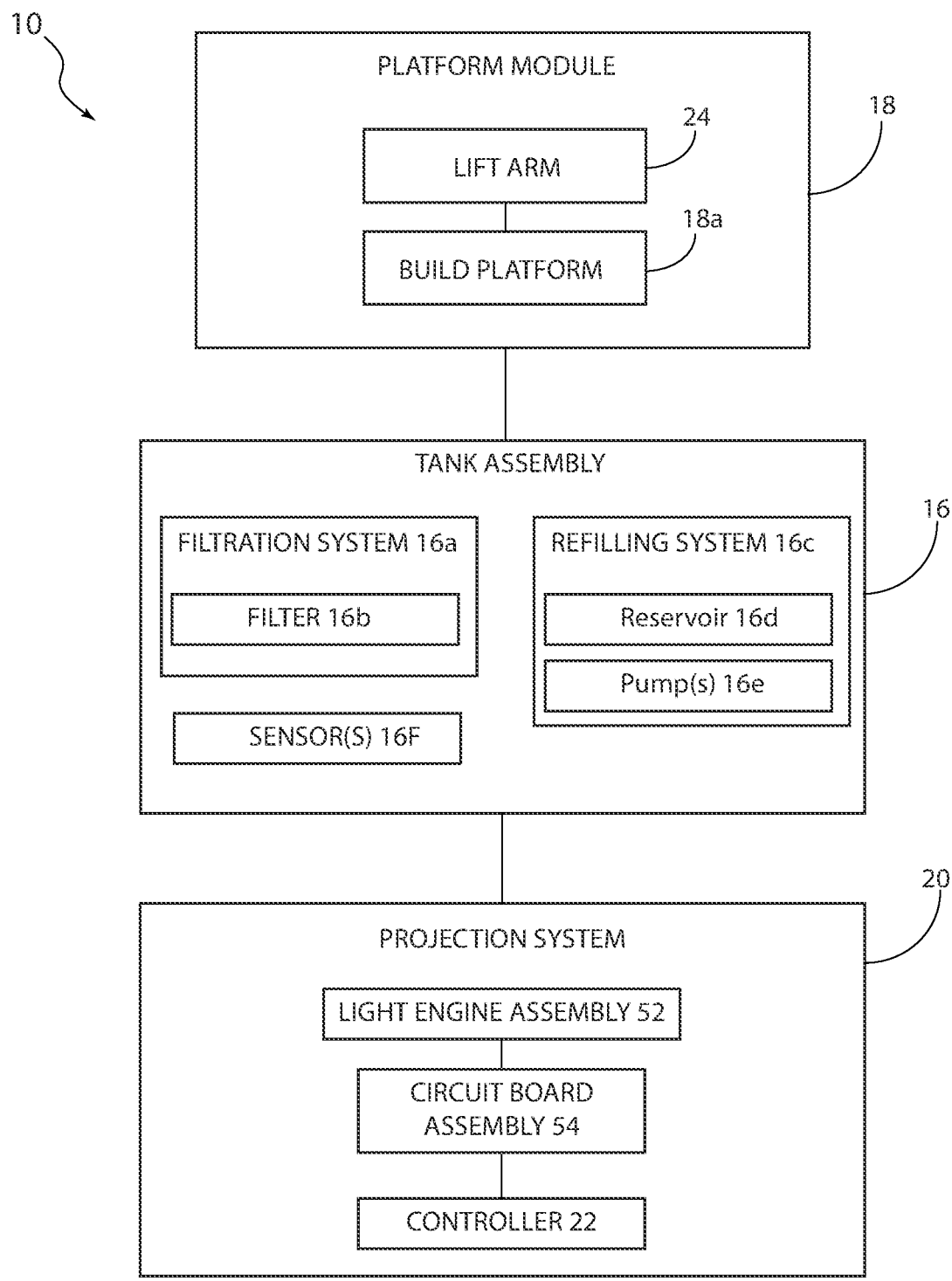
FIG. 1B is a general block diagram of a system configured for use in performing the disclosed 3D printing.

Referring to FIG. 1, in some embodiments, using the disclosed 3D printer system begins with importing the 3D model (captured image) via a data format of .STL, .OBJ or any other applicable format into the associated software that is installed on a remote computer. Again, it will be appreciated that the model can be imported directly into the printing system itself in the event the processing system resides within the printing system or it can be transmitted wirelessly. The user decides on printing parameters such as the orientation of printing, desired layer thickness, and the desired type of printing material. The software then starts to slice the model towards its height and generates the information of each cross section. The "slice" information and various other desired printing parameters are sent to the controller 22. The controller 22 connects to the projector module 20 and starts to project each slice for a specific duration that is defined by the forming material properties ranging from a fraction of a second to tens of seconds. It will be appreciated that these ranges will vary based upon the forming material used, the energy source used to activate the forming material to form a solid and the desired solid object sought to be printed.

Figure 12:
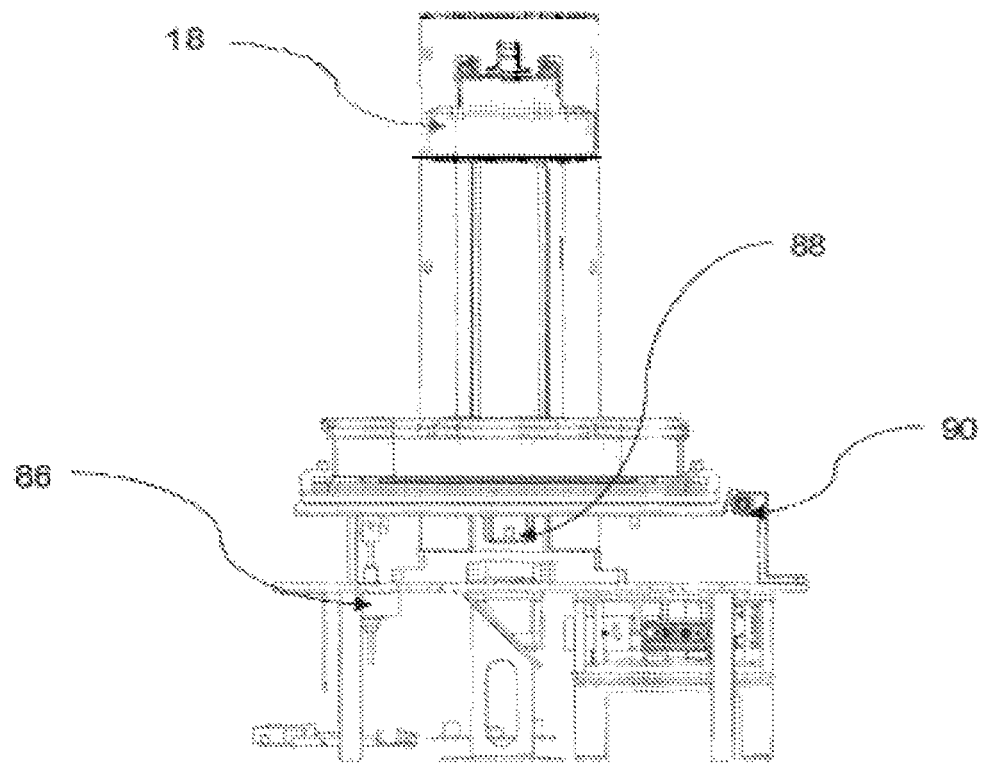
FIG. 12 is front view of the machine without the cover.
Figure 13:
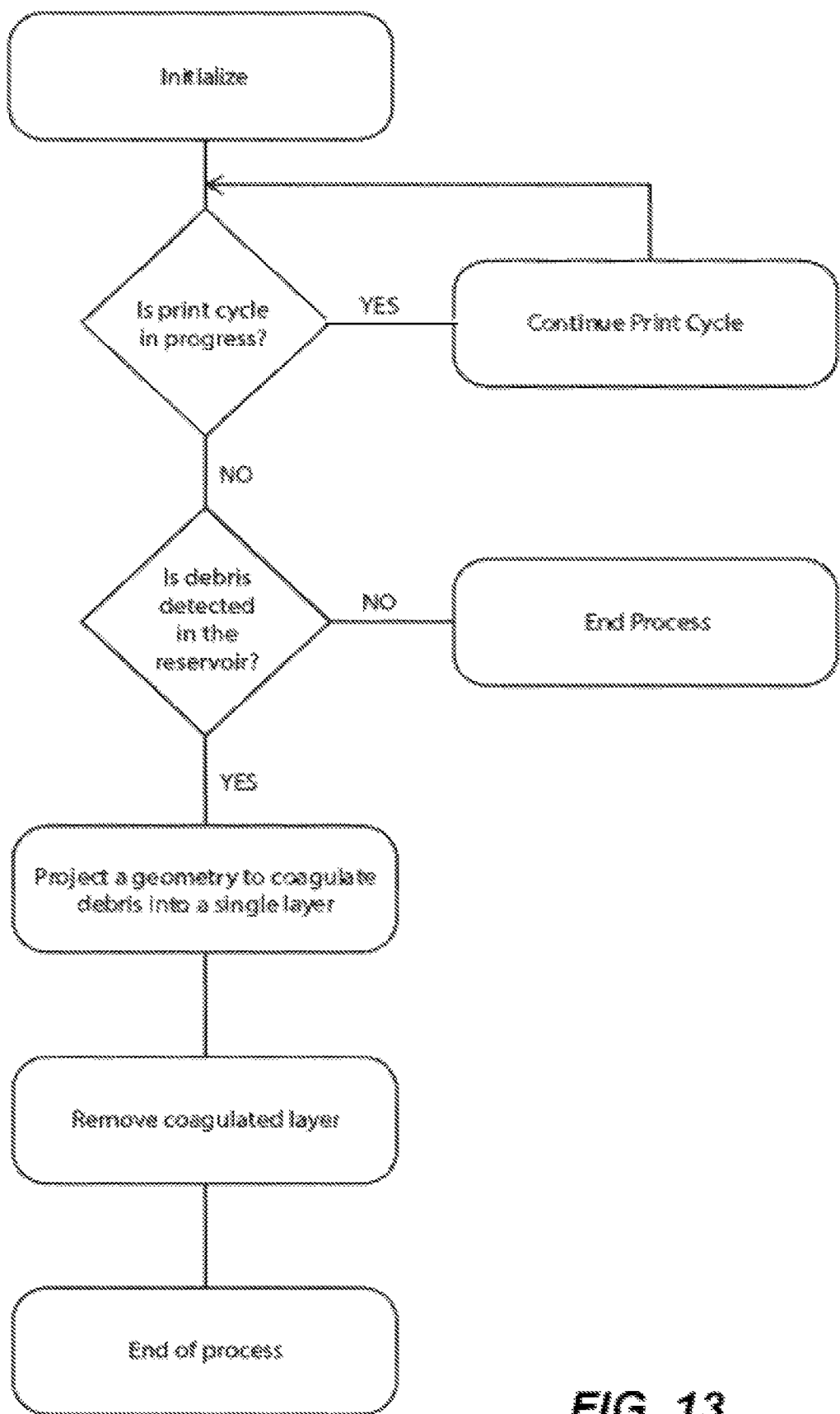
FIG. 13 is the flowchart of cleaning process.

After the projection process is complete, there typically exists a cured material between the bottom of the reservoir 16, and the build platform 18. At this point, the reservoir tank 16 tilts to separate the cured section from its bottom assembly. Such tilting is performed using a linear stepper motor 86 (see FIG. 12) that is installed on one side of the reservoir tank and by using a hinge 90 (see FIG. 12) located on the other side of the assembly. The linear motor is a stepper motor that is either coupled with a lead screw or it is a stepper motor with a lead screw as rotor. Sensors, servo motors, or any other acceptable feedback systems may be used to obtain the accurate position of the tank to make certain the tank always tilts in to the same location.

In various embodiments, the tilting may be accomplished using multiple linear motors, solenoids, springs, magnets and a cam mechanism. The next step is to raise the platform 18 and the arm 24 so that the unspoiled/uncured forming material can be used to create the next cured section in a subsequent forming step. In an alternative design, the arm rises before the separation of the part from the bottom of the tank, therefore pulling the reservoir upward around the hinge 90. Such iteration doesn't require any linear motors. This iteration merely uses a passive hinge structure 90. In this embodiment, at a given point the suction force breaks and the tank returns to its initial position. One cycle of printing consists of curing one layer, separating the layer from the tank and raising the platform. Multiple cycles continue until all the layers are fabricated.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims. Various aspects of the systems, methods, functions, steps, features and the like corresponding thereto disclosed herein may be implemented on one or more computer systems using hardware, software, firmware, circuits, or combinations thereof. Hardware, software, firmware, and circuits respectively refer to any hardware, software, firmware, or circuit component. Computer systems referred to herein may refer to any computing device and vice versa (e.g., smart phone, mobile computing device, personal data assistant, tablet computer, laptop computer, desktop computer, other computing device, and the like). For example, each computer system or computing device in the systems described herein or any embodiment of a system disclosed herein may utilize one or more of the following components: a single-core or multi-core hardware processor (e.g., central processing unit or graphics processing unit) on which software instructions are executed (e.g., instructions corresponding to an operating system, an application program, an interpreter such as a virtual machine, or a compiler); a memory associated with and in connection with the hardware processor such as cache or other system memory that stores software instructions or other data that the hardware processor may access for processing; an input device (e.g., mouse, keyboard, touchscreen, and the like); an output device (e.g., display, touchscreen, printer, and the like); a network or communication interface that enables the computer system to communicate over a network or communication protocol; an application program having corresponding software instructions that are executable by a hardware processor. Connections between different computer systems and connections between different computer system components may be wired or wireless.

Virtualization computing techniques, cloud computing techniques, web application/website computing techniques, traditional and adaptive streaming techniques, and other computing techniques may be implemented by any embodiment of a system disclosed herein to enable and/or enhance the teachings described herein. For example, in a cloud computing embodiment, one or more servers (i.e., one or more computer systems) may store and execute software instructions corresponding to an application program based on input data received from client devices. In response to the input data received, the application program is executed accordingly, which results in graphical data being processed and output to the client devices for display on a display such as a touch screen on a smart phone or tablet computer.

As another example, in a web application or website embodiment, data representative of a user input may be transmitted to a server (i.e., a computer system) hosting the website for processing and storage in memory. In an application program embodiment, the application may be stored and executed locally on a user's computer system. In other embodiments, one or more components of the application program may be stored and executed on a server and the user's computer system. For example, a user may download the application program from an app store for an Android computing device, Blackberry computing device, Apple computing device, Windows computing device, Samsung computing device, other computing device, and the like. Execution of the application program on the user's computing device may require that the device transmit and receive data to and from one or more computing devices such as a server or other user's computing device. For example, an application may be downloaded from a server to a mobile device. Upon installation, the mobile device may communicate with a server.

One or more embodiments of the systems disclosed herein may utilize streaming technology. Streaming data enables data to be presented to the user of the client device while the client device receives data from the server. Streaming data from servers to client devices (e.g., computing devices operated by users) over a network is typically limited by the bandwidth of the network, or alternatively, the physical layer net bitrate. Traditional streaming protocols, such as RTSP (Real-Time Streaming Protocol), MS-WMSP (Windows Media HTTP Streaming Protocol), and RTMP (Real-Time Messaging Protocol) may be implemented, which essentially send data in small packets from the server to the client device in real-time at the encoded bitrate of the data. Adaptive streaming may also be implemented. Adaptive streaming almost exclusively relies on HTTP for the transport protocol. Similar to traditional streaming, data is encoded into discrete packets of a particular size; however, the source data is encoded at multiple bitrates rather than a single bitrate. The data packets corresponding to the same data encoded at different bitrates are then indexed based on the bitrate in memory. This streaming method works by measuring, in real-time, the available bandwidth and computer capacity of the client device, and adjusts which indexed data packet to transfer based on the encoded bitrate.

One or more aspects of the systems disclosed herein may be located on (i.e., processed, stored, executed, or the like; or include one or more hardware or software components) a single computer system or may be distributed among a plurality of computer systems attached by one or more communication networks (e.g., internet, intranet, a telecommunications network, and the like). One or more components of a computer system may be distributed across one or more computer systems in communication with the computer system over a communication network. For example, in some embodiments, the systems disclosed herein may utilize one or more servers (i.e., one or more computer systems dedicated for a particular purpose in the system) that may be dedicated to serve the needs of one or more other computer systems or components across a communication network and/or system bus. The one or more servers may provide a central processing location for one or more aspects of the systems disclosed herein.

Again, various aspects of the systems, methods, function, and steps corresponding thereto disclosed herein may be implemented on one or more computer systems using hardware, software, firmware, or combinations thereof. Those of ordinary skill in the art will appreciate that one or more circuits and/or software may be used to implement the system and methods described herein. Circuits refer to any circuit, whether integrated or external to a processing unit such as a hardware processor. Software refers to code or instructions executable by a computing device using any hardware component such as a processor to achieve the desired result. This software may be stored locally on a processing unit or stored remotely and accessed over a communication network.

As disclosed herein, a processor or hardware processor may refer to any hardware processor or software processor. A software processor may include or otherwise constitute an interpreter that is executed by a corresponding hardware processor. A computer system according to any embodiment disclosed herein is configured to perform any of the described functions related to the various embodiments of the systems disclosed herein.

As disclosed herein, any method, function, step, feature, or result may be considered a module that may include software instructions that cause, when executed by a computing device, the desired method, function, step, feature, or result. Executed by a computing device includes execution by any hardware component (e.g., CPU, GPU, network interface, integrated circuits, other hardware components, and the like) of the computing device such as a hardware processor. Any module may be executed by a computing device (e.g., by a processor of the computing device). Any method, function, step, feature, result, and the like disclosed herein may be implemented by one or more software modules whether explicitly described or not. Individual components within a computing device may work together to accomplish a desired method, function, step, feature, or result. For example, a computing device may receive data and process the data. A simple example would be that a network interface receives the data and transmits the data over a bus to a processor.

Various aspects of the systems disclosed herein may be implemented as software executing in a computer system. The computer system may include a central processing unit (i.e., a hardware processor) connected to one or more memory devices, a graphical processing unit, input devices such as a mouse and keyboard, output devices such as speakers and a display, a network interface to connect to one or more other computer systems (e.g., one or more computer systems configured to provide a service such that function as a database), an operating system, a compiler, an interpreter (i.e., a virtual machine), and the like. The memory may be used to store executable programs and data during operation of the computer system. The executable programs may be written in a high-level computer programming language, such as Java or C++. Of course, other programming languages may be used since this disclosure is not limited to a specific programming language or computer system. Further, it is to be appreciated that the systems and methods disclosed herein are not limited to being executed on any particular computer system or group of computer systems.

Some methods, functions, steps, or features have been described as being executed by corresponding software by a processor. It is understood than any methods, functions, steps, features, or anything related to the systems disclosed herein may be implemented by hardware, software (e.g., firmware), or circuits despite certain methods, functions, steps, or features having been described herein with reference to software corresponding thereto that is executable by a processor to achieve the desired method, function, or step. It is understood that software instructions may reside on a non-transitory medium such as one or more memories accessible to one or more processors in the systems disclosed herein. For example, where a computing device receives data, it is understood that the computing device processes that data whether processing the data is affirmatively stated or not. Processing the data may include storing the received data, analyzing the received data, and/or processing the data to achieve the desired result, function, method, or step. It is further understood that input data from one computing device or system may be considered output data from another computing device or system, and vice versa. It is yet further understood that any methods, functions, steps, features, results, or anything related to the systems disclosed herein may be represented by data that may be stored on one or more memories, processed by one or more computing devices, received by one or more computing devices, transmitted by one or more computing devices, and the like.

The various embodiments and examples described herein are provided by way of illustration only and should not be construed to limit the claimed invention, nor the scope of the various embodiments and examples. Those skilled in the art will readily recognize various modifications and changes that may be made to the claimed invention without following the example embodiments and applications illustrated and described herein, and without departing from the true spirit and scope of the claimed invention, which is set forth in the following claims. In addition, various embodiments may be combined. Therefore, reference to an embodiment, one embodiment, in some embodiments, in other embodiments, and the like does not preclude one or more methods, functions, steps, features, results, hardware implementations, or software implementations of different embodiments from being combined. Further, reference to an embodiment, one embodiment, in some embodiments, in other embodiments, examples, and the like provides various aspects that may or may not be combined with those of one or more different embodiments and/or examples.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet, if any, including but not limited to U.S. Provisional Patent Application No. 62/313,575, titled "SYSTEM AND METHOD FOR THREE-DIMENSIONAL PRINTING," filed Mar. 25, 2016, are incorporated herein by reference, in their entirety. Aspects of the embodiments can be modified, if necessary, to employ concepts of the various patents, applications and publications to provide yet further embodiments. These and other changes can be made to the implementations in light of the above-detailed description.

The invention claimed is:

1. A three-dimensional printing system, comprising:
   a reservoir tank having a bottom surface and at least one side wall, the bottom surface and the at least one side wall which form an interior of the reservoir tank for storing one or more forming materials that are responsive to electromagnetic radiation of a defined range of wavelengths to form a solid material, the reservoir tank including a drum assembly having a hydrophobic material stretched between a top stretcher wall of the drum assembly and an inner wall of the bottom portion of the reservoir tank, and the stretched hydrophobic material is in the shape of a drum;
   a projector to project electromagnetic radiation that includes the defined range of wavelengths towards the reservoir tank to cure a portion of the one or more forming materials stored in the reservoir tank to form in the reservoir tank at least a section of a solid object comprised of the solid material; and
   a lifting platform moveable in a direction perpendicular to the bottom surface of the reservoir tank, the lifting platform configured to move the solid object perpendicularly away from the bottom surface after the section of the solid object is formed, whereby additional sections of the solid object can be formed in the interior of the reservoir tank; and
   a wiper and/or a scraper coupled to the reservoir tank, the wiper and/or the scraper adapted to remove debris from the bottom surface.

2. The system of claim 1, wherein:
   the reservoir tank is further configured to tilt in relation to the lifting platform in order to separate a cured portion of the one or more forming materials from the bottom surface of the reservoir tank.

3. The system of claim 2, further comprising:
a passive hinge coupled to the reservoir that enables the reservoir tank to be tilted and returned to an initial position by the movement of the lifting platform during one or more printing cycles of the system.

4. The system of claim 2, further comprising:
a motor coupled to the reservoir tank and configured to tilt the reservoir tank and to return the reservoir tank to an initial position during one or more printing cycles of the system.

5. The system of claim 2, further comprising:
a feedback system configured to obtain an accurate position of the reservoir tank so that the reservoir tank tilts into a same location during one or more printing cycles of the system.

6. The system of claim 5, wherein:
the feedback system comprises of one or more sensors or one or more servo motors.

7. The system of claim 1, wherein:
the reservoir tank comprises a single-use drum assembly having a protective seal to enclose the one or more forming materials inside the reservoir tank.

8. The system of claim 1, wherein the projector is operable to project electromagnetic radiation in a range of 365 nanometers to 410 nanometers.

9. The system of claim 1, wherein projector is operable to project electromagnetic radiation in a range of 405 nanometers to 410 nanometers.

10. The system of claim 1, wherein the bottom surface of the reservoir tank is transparent to electromagnetic radiation in at least the defined range of wavelengths, and the projector is orientable to project the electromagnetic radiation into the reservoir tank via the bottom surface.

11. The system of claim 1, further comprising:
a controller including at least one processor and at least one nontransitory processor-readable medium that stores at least one of processor-executable instructions and data, which when executed by the at least one processor, cause the at least one processor to iteratively;
cause the projector to project spatial pattern of the electromagnetic radiation into the reservoir tank to form each of respective additional section of the solid object; and
cause the lifting platform to move away from the bottom of the reservoir tank as each of respective additional section of the solid object is formed.

* * * * *